United States Patent
Shih et al.

(10) Patent No.: US 8,066,478 B1
(45) Date of Patent: Nov. 29, 2011

(54) PREVENTING HOT-GAS INGESTION BY FILM-COOLING JET VIA FLOW-ALIGNED BLOCKERS

(75) Inventors: Tom I-P Shih, Ames, IA (US); Sangkwon Na, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1009 days.

(21) Appl. No.: 11/975,012

(22) Filed: Oct. 17, 2007

Related U.S. Application Data

(60) Provisional application No. 60/829,734, filed on Oct. 17, 2006.

(51) Int. Cl.
*F01D 5/08* (2006.01)
(52) U.S. Cl. ............ 416/1; 416/97 R; 415/115; 415/116
(58) Field of Classification Search .................. 415/115, 415/116; 416/95, 97 R, 1
See application file for complete search history.

(56) References Cited

U.S. PATENT DOCUMENTS

| | | | | |
|---|---|---|---|---|
| 3,423,069 | A | * | 1/1969 | Chandley .................. 416/92 |
| 4,390,320 | A | * | 6/1983 | Eiswerth .................. 416/97 R |
| 4,773,593 | A | | 9/1988 | Auxier et al. |
| 5,326,224 | A | * | 7/1994 | Lee et al. .................. 416/97 R |
| 5,498,133 | A | | 3/1996 | Lee |
| 6,099,253 | A | | 8/2000 | Fukue et al. |
| 6,224,336 | B1 | * | 5/2001 | Kercher .................. 416/97 R |
| 6,617,003 | B1 | * | 9/2003 | Lee et al. .................. 416/241 B |
| 7,056,093 | B2 | | 6/2006 | Self et al. |
| 7,182,576 | B2 | | 2/2007 | Bunker et al. |
| 7,207,775 | B2 | | 4/2007 | Muriithi |
| 2002/0187044 | A1 | * | 12/2002 | Lee et al. .................. 416/97 R |
| 2005/0118023 | A1 | | 6/2005 | Bunker et al. |
| 2005/0220618 | A1 | | 10/2005 | Zhang et al. |

OTHER PUBLICATIONS

George, Tom J. et al., "Effects of Partial Blockage of Film Cooling Holes and Deposits on Film Cooling Effectiveness and Heat Transfer", SCIES Project 04-01-SR115, Aug. 1, 2004, 35 pages.
Na, S. et al., "Increasing Adiabatic Film-Cooling Effectiveness by Using an Upstream Ramp", GT-2006-91163, 53rd ASME Gas Turbine and Aeroengine Technical Congress, Exposition, and User Symposium, May 8-11, 2006, pp. 1-8.
Na, S. et al., "Increasing Film-Cooling Adiabatic Effectiveness by Using an Upstream Ramp", GT-2006-91163, 53rd ASME Gas Turbine and Aeroengine Technical Congress, Exposition, and User Symposium, May 8-11, 2006, pp. 1-7.
Shih, Tom et al., "Effects of Coating Blockage and Deposits on Film-Cooling Effectiveness and Heat Transfer", UTSR Peer Review Workshop III, Oct. 17-19, 2006, 30 pages.

(Continued)

*Primary Examiner* — Igor Kershteyn
(74) *Attorney, Agent, or Firm* — McKee, Voorhees & Sease, P.L.C.

(57) ABSTRACT

A system for cooling includes a surface to be cooled, at least one film-cooling hole within the surface for allowing a film cooling jet of coolant to reach the surface, each of the at least one film-cooling hole having a diameter and at least two spaced apart flow-aligned blockers positioned downstream of the at least one-film cooling hole, each of the flow-aligned blockers extending upwardly from the surface to assist in preventing hot-gas entrainment and increasing adiabatic effectiveness by confining coolant flow downstream of the at least one film-cooling hole between the blockers.

25 Claims, 11 Drawing Sheets

OTHER PUBLICATIONS

Shih, Tom et al., "DoD-DoE-FAA-NASA Propulsion and Power Systems Alliance" Nov. 8, 2005, Turbine Life Center, 45 pages.
Shih, T. I-P et al., "Preventing Hot Gas Ingestion by Film-Cooling Jets via Flow-Aligned Blockers", 53rd ASME Gas Turbine and Aeroengine Technical Congresss, Exposition, and User Symposium, May 8-11, 2006, pp. 1-9.
Shih, T. I-P et al., "Momentum-Preserving Shaped Holes for Film Cooling" Proceedings of GT2007-27600 ASME Turbo Expo 2007: Power for Land, Sea and Air, May 14-17, 2007, pp. 1-7.

* cited by examiner (a)

(b)

(a)

(b)

(a)

(b)

US 8,066,478 B1

PREVENTING HOT-GAS INGESTION BY FILM-COOLING JET VIA FLOW-ALIGNED BLOCKERS

CROSS-REFERENCE TO RELATED APPLICATIONS

This application claims priority to provisional application Ser. No. 60/829,734 filed Oct. 17, 2006, herein incorporated by reference in its entirety.

GRANT REFERENCE

This invention was partially funded by DOE Contract No. DE-FC26-02NT41431. The government may have certain rights in the invention.

BACKGROUND OF THE INVENTION

To increase thermal efficiency and specific thrust, advanced gas turbine stages are designed to operate at increasingly higher inlet temperatures (Suo, 1985). This increase is made possible by advances in materials such as super alloys and thermal-barrier coatings and by advances in cooling technology such as internal, film, impingement, and other techniques (Suo, 1985; Metzger, 1985; Moffat, 1987). With cooling, inlet temperatures can far exceed allowable material temperatures. Though cooling is an effective way to enable higher inlet temperatures, efficiency considerations demand effective cooling to be accomplished with minimum amount of cooling air since it takes energy to pump the cooling air through the turbine system, which operates at high pressures.

For advanced gas turbines, the first-stage stator and rotor typically require film cooling, which strives to form a blanket of cooler air next to the material surface to insulate the material from the hot gas (Golstein, 1971). Many investigators have studied the effects of design and operating parameters on film cooling. These include film-cooling hole inclinations and length-to-diameter ratios, spacing between holes, geometry of holes including shaped holes, surface curvatures, mainflow turbulence, embedded vortices in the mainflow, and unsteadiness from rotor-stator interactions (see, e.g., reviews by Han et al. (2000), Goldstein (2001), Sundén & Faghri (2001), and Shih & Sultanian (2001); in addition see the comprehensive bibliography provided by Kercher (2003 and 2005)).

Of the previous studies, Kelso & Lim (1996) and Haven et al. (1997) showed the important role played by vortices in the evolution of film-cooling jets. One pair, referred to as the counter-rotating vortices (CRVs), was found to lift the jet off the surface that it is intended to protect and to entrain hot gases underneath it. The other pair, referred to an anti-kidney pair, was shown to have a sense of rotation opposite to that of the CRVs, and so can counteract the undesirable tendencies of the CRVs. Thus, it is of interest to develop strategies to control the formation and strength of these vortices in a way that leads to more effective film cooling.

There are several ways to address this problem. One way that has been proposed by several investigators is to alter the structure of these vortices. These include alterations by using shaped-diffusion holes and slots (e.g., Haven et al. (1997), Hyams et al. (1997), and Thole et al. (1998)), by judicious placement of vortex generators (Haven & Kurosaka (1996)), by constructing tabs at hole exit (Zaman & Foss (2005) and Zaman (1998)), by inserting struts inside film-cooling holes (Shih, et al. (1999)), and by creating a trench about the exit of each film-cooling hole (Bunker (2002)). An alternative way is to prevent the CRVs from entraining hot gases by downstream treatment, and this has not been reported.

Thus, although the problems with cooling surfaces associated with gas turbines have been studied and various improvements proposed, problems remain.

BRIEF SUMMARY OF THE INVENTION

Therefore, it is a primary object, feature, or advantage of the present invention to improve over the state of the art.

It is a further object, feature, or advantage of the present invention to provide a method and apparatus for cooling in a turbine system in an efficient manner.

Another object, feature, or advantage of the present invention is to minimize the entrainment of hot gases by the CRVs so that film-cooling effectiveness improves without unduly increasing surface heat transfer and pressure loss.

A further object, feature, or advantage of the present invention is to improve cooling without needing to shape the film-cooling hole.

A still further object, feature, or advantage of the present invention is to use a blocker to improve the adiabatic effectiveness of film-cooling jets.

One or more of these and/or other objects, features, or advantages of the present invention will become apparent from the specification and claims that follow.

Flow aligned blockers of the present invention assist in minimizing the entrainment of hot gases underneath film-cooling jets by the counter-rotating vortices within the jets. Computations, based on the ensemble-averaged Navier-Stokes equations closed by the realizable k-e turbulence model, were used to assess the usefulness of rectangular prisms as blockers in increasing film-cooling adiabatic effectiveness without unduly increasing surface heat transfer and pressure loss. The Taguchi's design of experiment method was used to investigate the effects of the height of the blocker (0.2D, 0.4D, 0.8D), the thickness of the blocker (D/20, D/10, D/5), and the spacing between the pair of blockers (0.8D, 1.0D, 1.2D), where D is the diameter of the film-cooling hole. The effects of blowing ratio (0.37, 0.5, 0.65, 1.0) were also studied. Results obtained show that blockers can greatly increase film-cooling effectiveness. By using rectangular prisms as blockers, the laterally averaged adiabatic effectiveness at 15D downstream of the film-cooling hole is as high as that at 1D downstream. The surface heat transfer was found to increase slightly near the leading edge of the prisms, but reduced elsewhere from reduced temperature gradients that resulted from reduced hot gas entrainment. However, pressure loss was found to increase somewhat because of the flat rectangular leading edge, which can be made more streamlined.

According to one aspect of the present invention, a system for cooling includes a surface to be cooled. There is at least one film-cooling hole within the surface for allowing a film cooling jet of coolant to reach the surface, each of the at least one film-cooling hole having a diameter. There are at least two spaced apart flow-aligned blockers positioned downstream of the at least one-film cooling hole, each of the flow-aligned blockers extending upwardly from the surface to assist in preventing hot-gas entrainment and increasing adiabatic effectiveness by confining coolant flow downstream of the at least one film-cooling hole between the blockers. The geometry of the flow-aligned blockers may vary in length, height, spacing and thickness. Each of the flow-aligned blockers may have a rectangular cross section although other shapes are contemplated.

According to another aspect of the present invention, an improvement to a gas turbine having a surface proximate hot gas is provided. The improvement includes at least one film-cooling hole providing access for a film cooling jet of coolant to reach the surface to thereby form a cool film between the hot gas and the surface and at least two spaced apart flow-aligned blockers positioned downstream of the at least one-film cooling hole, each of the flow-aligned blockers extending upwardly from the surface to assist in preventing hot-gas entrainment and increasing adiabatic effectiveness by confining coolant flow downstream of the at least one film-cooling hole between the blockers.

According to another aspect of the present invention, a method of cooling a surface is provided. The method includes providing coolant through a film-cooling hole to form a cool film between the hot gas and the surface and using a plurality of flow-aligned blockers positioned at a distance downstream of the film-cooling hole to affect film-cooling effectiveness. The surface may be disposed within a gas turbine.

DETAILED DESCRIPTION OF THE PREFERRED EMBODIMENT

The present invention uses flow-aligned blockers to minimize the entrainment of hot gases by the CRVs so that film-cooling effectiveness improves without unduly increasing surface heat transfer and pressure loss. Since extended surfaces can increase surface heat transfer and this is undesirable on the hot-gas side, it is noted that the blockers can be constructed in the thermal-barrier coating (TBC) system by using the ceramic top coat, which has very low thermal conductivity (private communication with Bunker (2002)). The objective of this study is twofold. The first is to assess the usefulness of the "blocker" concept in improving the adiabatic effectiveness of film-cooling jets, to examine the nature of the flow induced by the blockers, and to show how they minimize hot-gas entrainment. The second objective is to perform a parametric study to examine the effects of design parameters for a generic blocker. This study will be accomplished by using computational fluid dynamics (CFD) analysis that accounts for the three-dimensional nature of the flow and resolves the hot gas and film-cooling jet interactions above the plate as well as the flow in the plenum and in the film-cooling holes.

To demonstrate the usefulness of flow-aligned blockers to improve film-cooling effectiveness, the problem of film-cooling of a flat plate from a row of inclined circular holes is studied. The problem selected is similar to the experimental study of Kohli & Bogard (1995) so that the meaningfulness of this computational study can be assessed by comparing the CFD predictions with the measurements.

Figure 1:
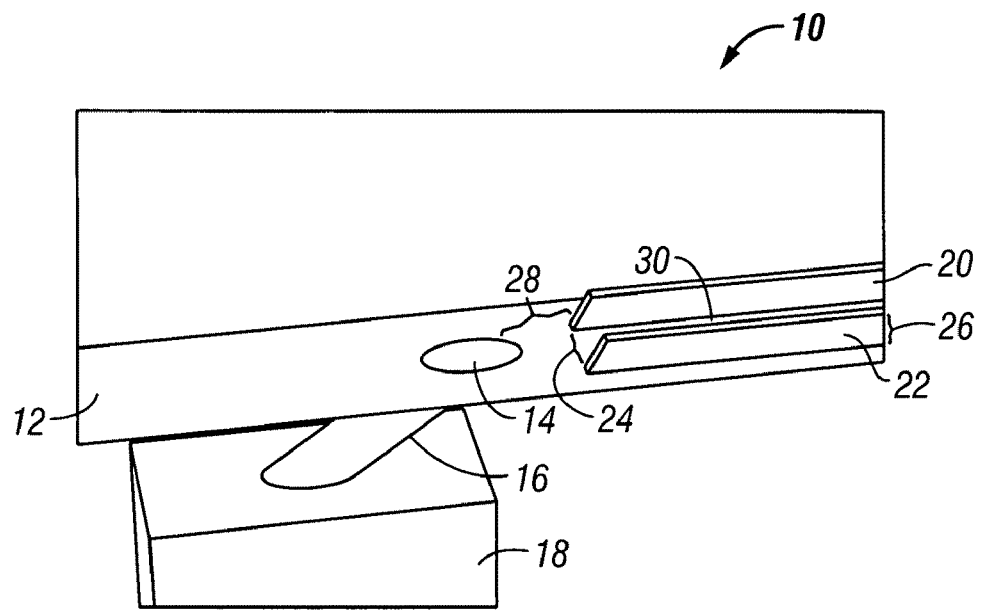
FIG. 1 is a schematic of blockers downstream of a film-cooling hole.

FIG. 1 illustrates one embodiment of flow-aligned blockers. A system 10 is shown in FIG. 1, the system 10 may be associated with a gas turbine. A plate 12 is shown which has a hole 14. Downstream of the hole 14 are flow-aligned blockers 20, 22 which are spaced apart by a spacing 24. The flow-aligned blockers 20, 22 have a height 26. The flow-aligned blockers are positioned a distance 28 from the hole 14 in the surface 12. Coolant flows to the hole 14 through the tube 16 from a plenum 18.

Figure 2:
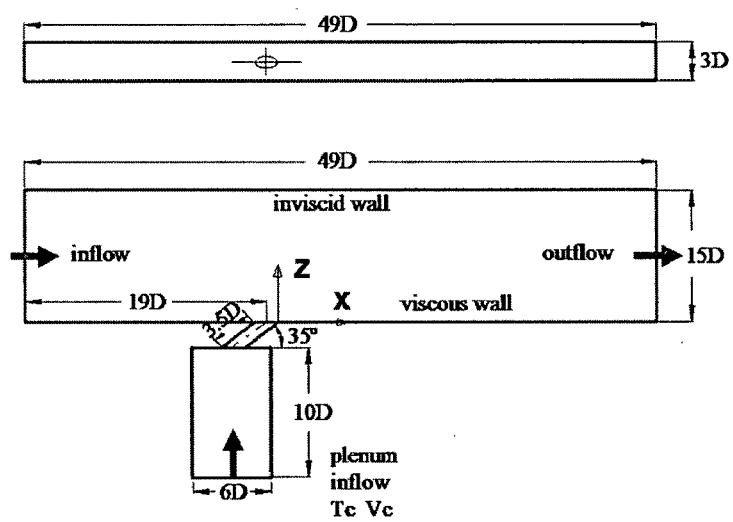
FIG. 2 is schematic of film cooling of a flat plate from a row of inclined circular holes (not drawn to scale).
Figure 3:
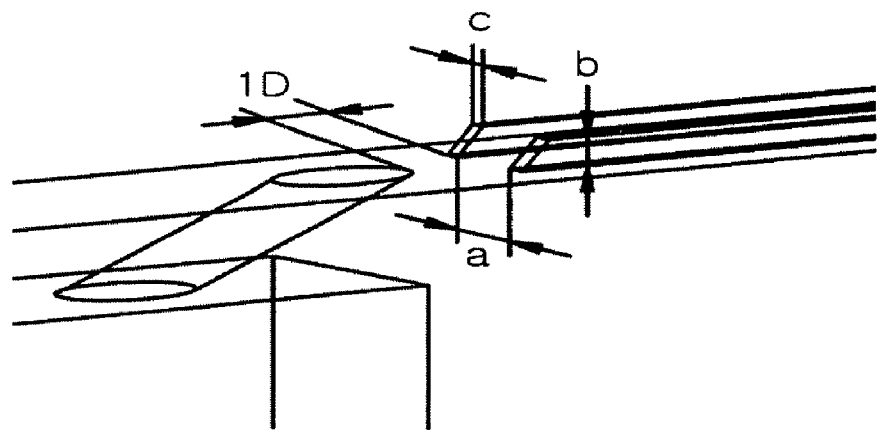
FIG. 3 is a schematic of "rectangular prism" blockers.

For the problem studied, as shown in FIG. 2, the cooling jets emerge from a plenum through one row of circular holes. Each hole has a diameter D of 12.7 mm, a length of 3.5D, and an inclination of 35° relative to the flat plate. The spacing between the centers of the film-cooling holes in the spanwise direction is 3D. Since the film cooling is for a flat plate in which the cooling jet emerges from a row of inclined holes, the flow-aligned blockers are taken to be pairs of parallel ribs or fence-like protrusions from the flat plate with rectangular cross sections as shown in FIGS. 1 and 3. These "rectangular prism" blockers are located 1D downstream of the film-cooling hole. Each blocker has height b and thickness c, and separated by a distance a. Three values of a, b, and c were examined, and they are as follows: 0.8D, D, and 1.2D for the spacing a; 0.2D, 0.4D, and 0.6D for the height b; and D/20, D/10/, and D/5 for the thickness c. Other dimensions that describe the geometry are given in FIGS. 1 to 3.

The operating conditions are as follows. The fluid for the main flow (hot gas) and coolant is air. The main flow above the flat plate has a freestream temperature $T_g$ of 298 K and a freestream velocity $U_g$ of 20 m/s along the x-direction. The flow in the boundary-layer is assumed to be turbulent from the leading edge of the flat plate. The coolant has a temperature $T_c$ of 188 K in the plenum. This gives a density ratio DR of 1.6. When the average velocity in the film-cooling holes $U_c$ is 6.25 m/s, the mass flux or blowing ratio M is 0.5. Two other blowing ratios were also studied, 0.37 and 0.65, by varying the velocity at the inflow of the plenum that feeds the film cooling holes.

Two types of boundary conditions were applied on the flat plate for the heat transfer study. When the film-cooling adiabatic effectiveness is sought, the flat plate is made adiabatic.

When the surface heat transfer coefficient is sought, the flat plate is maintained at a constant wall temperature $T_w$ of 243K. All other walls, including the walls of the film-cooling holes and the plenum, are made adiabatic. The back pressure at the outflow boundary above the flat plate is maintained at the standard atmospheric pressure.

For this problem, the computational domain is taken to be the region bounded by the solid lines shown in FIG. 2. As can be seen, periodicity is assumed in the spanwise direction so that only one film-cooling hole and one pair of blockers need to be examined. In addition, the "upper channel wall" (i.e., the wall without film-cooling holes) was moved closer to the wall with the film-cooling holes. This was done to reduce the size of the computational domain and hence computational cost. The errors incurred by this are minimized by making the "upper channel wall" sufficiently far away and by making it inviscid (i.e., the velocity there can slip despite the viscous nature of the flow) so that boundary layers will not form there.

Formulation and Numerical Method of Solution

The problem just described was modeled by the ensemble-averaged continuity, momentum (full compressible Navier-Stokes), and energy equations for a thermally and calorically perfect gas. The effects of turbulence were modeled by using the two-equation realizable k-e model (Shih et al., 1995). In all cases, the integration of all equations is to the wall (i.e., wall functions are not used).

Solutions to the aforementioned governing equations were obtained by using Version 6.1.18 of the Fluent-UNS code. The following algorithms in Fluent were invoked. Since only steady-state solutions were of interest, the SIMPLE algorithm was used. The fluxes at the cell faces representing advection were interpolated by using second-order upwind differences. The fluxes at the cell faces representing diffusion were interpolated by using second-order central differences. For all computations, iterations were continued until all residuals for all equations plateau to ensure convergence to steady-state has been reached. At convergence, the scaled residuals were always less than $10^{-6}$ for the continuity equation, less than $10^{-6}$ for the three components of the velocity, less than $10^{-8}$ for the energy equation and, and less than $10^{-5}$ for the turbulence quantities.

Grid-Sensitivity and Validation Study

Figure 4:
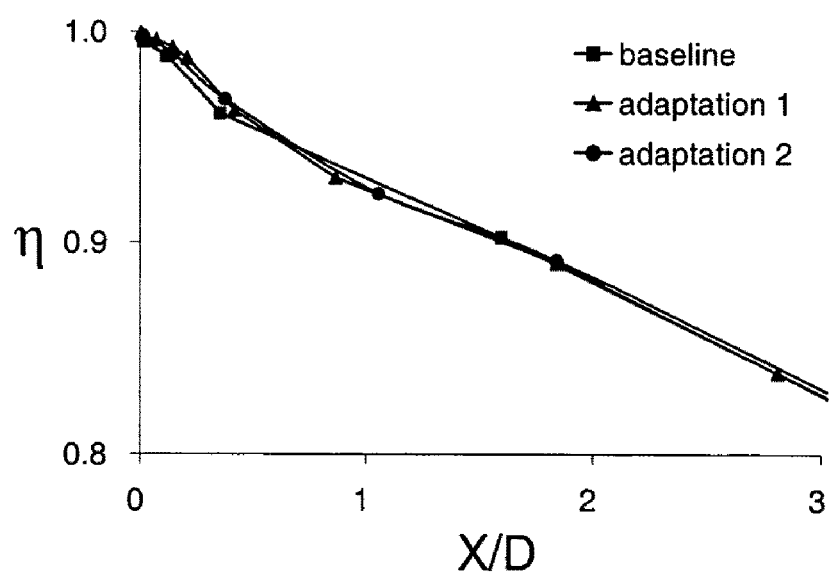
FIG. 4 is a grid-independent study: centerline adiabatic effectiveness for three grids.

Accuracy of solutions is strongly dependent upon the quality of the grid system in minimizing grid-induced errors and in resolving the relevant flow physics. In this study, a grid sensitivity study was carried out to determine the appropriate grid. FIG. 4 illustrates this study for the case without blockers, which involved three grids—the baseline grid with 2.291 million cells, a finer grid with 2.716 million cells (adaptation 1), and a still finer grid with 5.252 million cells (adaptation 2). For the two finer grids, the additional cells were all concentrated about the film-cooling hole and the hot gas/coolant jet interaction region, where the flow physics is most complicated. From this grid sensitivity study, the baseline grid was found to give essentially the same result for the centerline adiabatic effectiveness as those from adaptation 1 and 2 grids. The relative error in the "average" centerline adiabatic effectiveness is 0.4% when comparing results from the baseline grid with those from the adaptation 2 grid.

Figure 5:
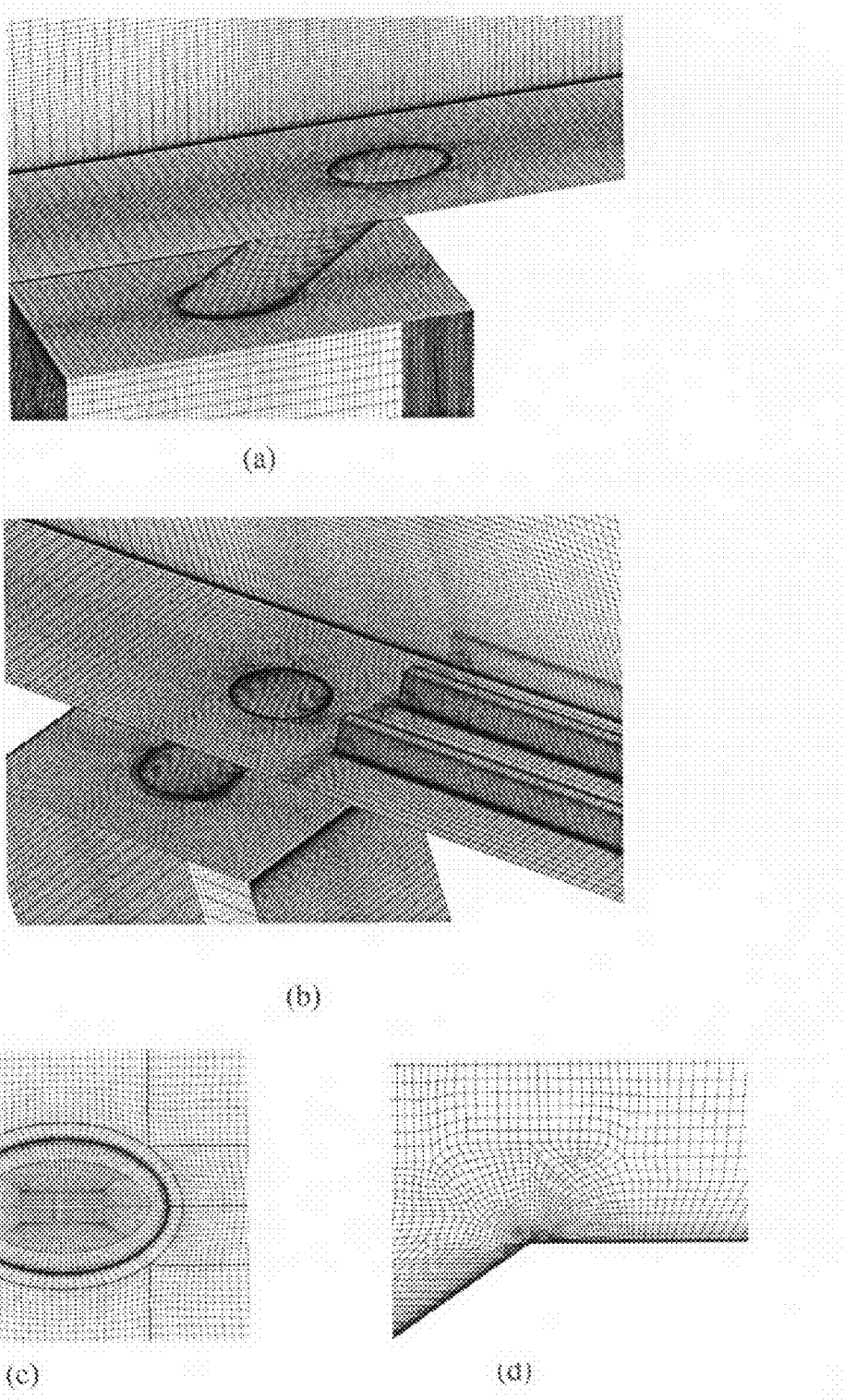
FIG. 5. is a grid systems used. (a) No blockers. (b) With blockers. (c) Grid around film-cooling hole (top view). (d) Grid around film-cooling hole through center of hole.
Figure 9:
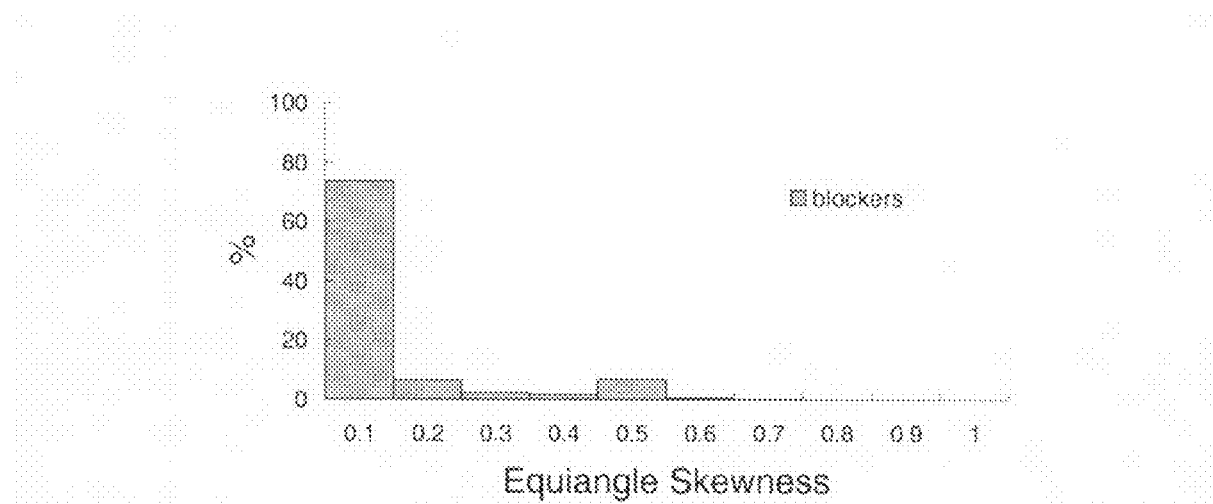
FIG. 9 is a histogram of equiangle skewness values for the case 3 in the blockers.
Figure 10:
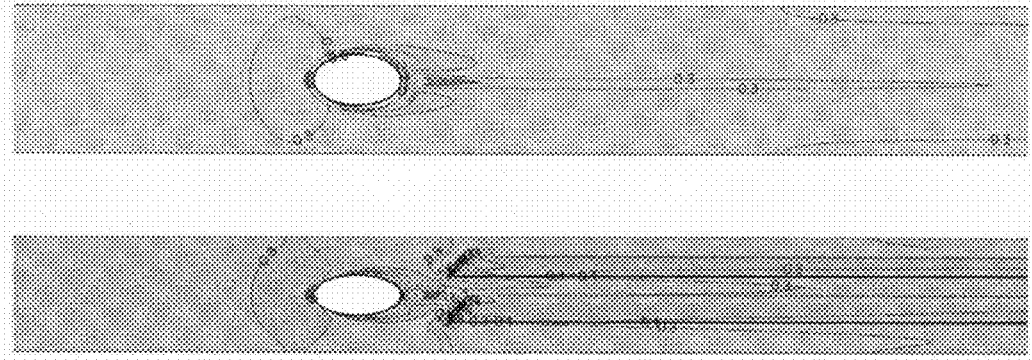
FIG. 10 is the distributions of the y+ values for the first cell away from the flat plate with the ramp.
Figure 11:
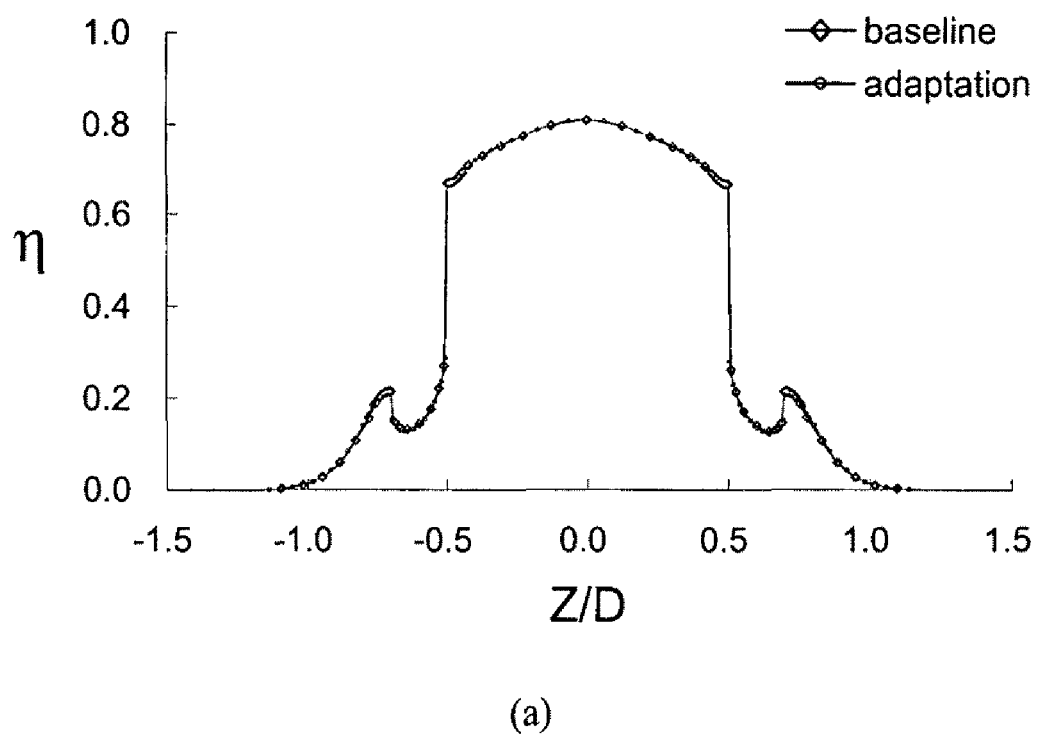
FIG. 11 is a grid-independent study for blockers: (a) adiabatic effectivenesses at X/D=3 in the spanwise direction. (b) centerline adiabatic effectiveness.
Figure 11:
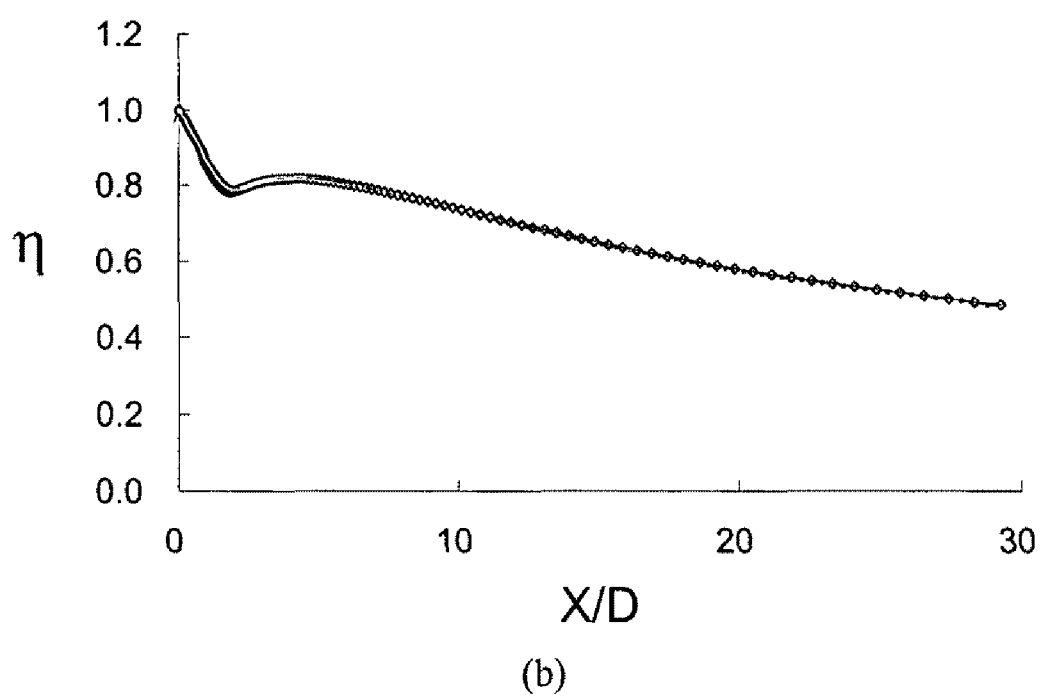

The grid systems used for this problem with and without blockers are shown in FIG. 5. When there are no blockers, the grid system used employ 2.291 million cells. When there are blockers, the grid systems used has cells that varied from 2.412 million to 2.478 million depending upon the height and thickness of each blocker. FIG. 9 shows the equiangle skewness is almost closed to 0.1 and less than 0.6 in the histogram. For all grids used, the first grid point away from all viscous walls has a $y^+$ less than unity. FIG. 10 shows $y+$ values are less than unity at the first grid point from the wall. Also, the first 5 grid points have $y^+$ values within five. The surface effectivenesses with h-refined grid are shown in FIG. 11. FIG. 11 shows the computed surface effectiveness at 3D downstream of the exit hole and along the centerline, and the calculations for different grids match well.

Figure 6:
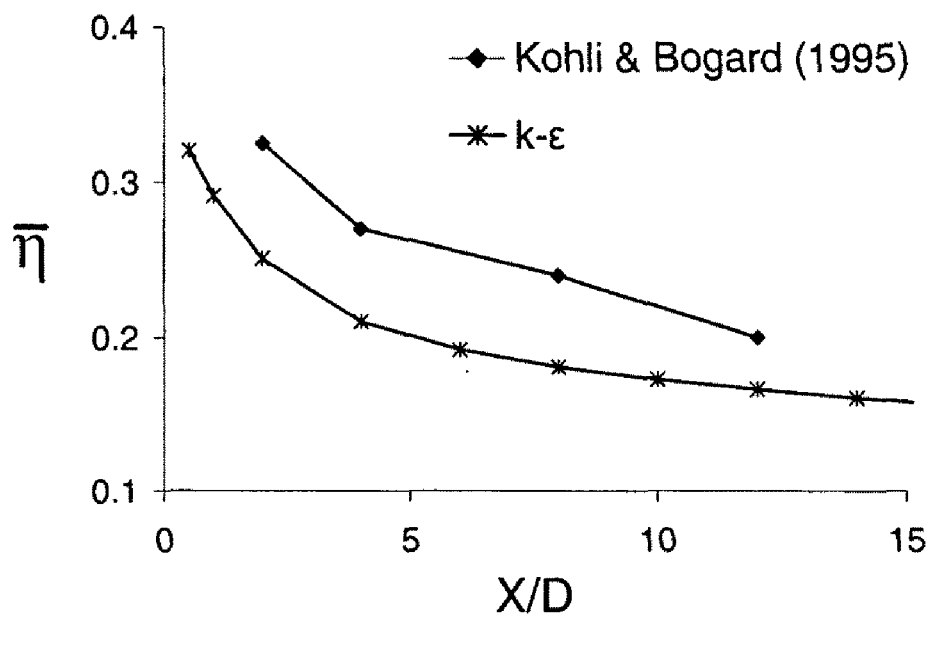
FIG. 6 is a validation study: CFD predictions and comparison with experimental data of Kohli & Bogard (1995) (L/D=2.8 to match experiment). (a) Laterally averaged. (b) Centerline.
Figure 6:
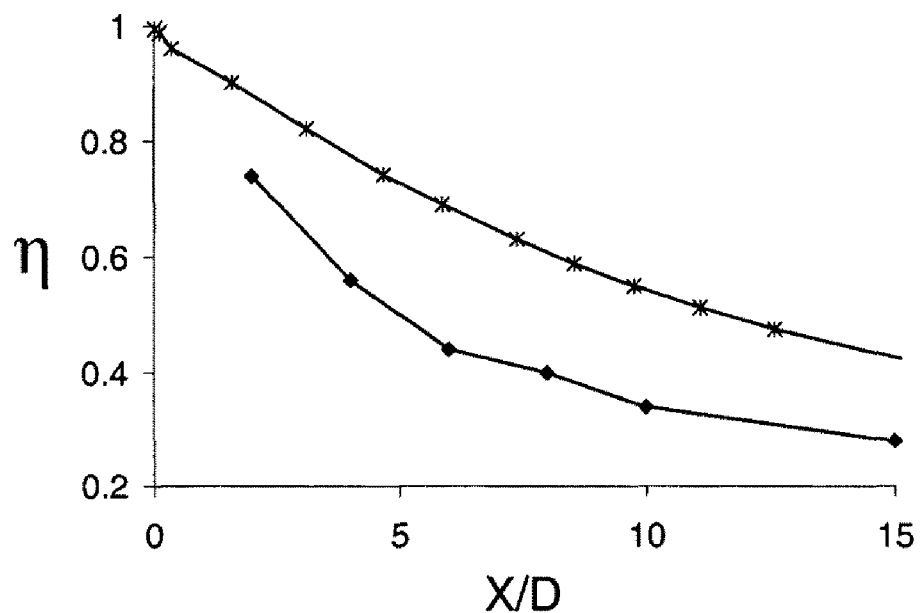

To assess the meaningfulness of this computational study, the grid-independent solutions generated for the problem of film-cooling over a flat plate were compared with the experimental data provided by Kohli & Bogard (1995) for L/D=2.8. At the leading edge of the film-cooling hole, the computations predicted a boundary-layer thickness of 0.14D, a shape factor of 1.49, and a Reynolds number based on the freestream velocity and momentum thickness of 1,492. The corresponding measured values are 0.12D, 1.48, and 1,100, respectively. This comparison shows that the flow upstream of the film-cooling hole is predicted reasonably well. Results for the predicted adiabatic effectiveness are shown in FIG. 6 along with experimentally measured ones. From this figure, it can be seen that the centerline adiabatic effectiveness is over predicted and that the laterally averaged adiabatic effectiveness is under predicted. This indicates that the realizable k-e model over predicts normal spreading and under predicts lateral spreading of the cooling jet. Despite this, the trends are predicted correctly. Also, the qualitative features of the flow are captured by the computations. Thus, though the predictions are not accurate quantitatively, they are good enough to discern differences in film-cooling designs.

Results

As will be shown, the proposed flow-aligned blockers do indeed greatly improve film-cooling adiabatic effectiveness without unduly increasing surface heat transfer or pressure rise. Instead of showing this for one configuration, the results will be presented in the following order. First, a parametric study that uses the Taguchi's design of experiments (Taguchi, 1978) is described from which an "optimal" blocker design is identified. Then, the nature of the flow field induced by blockers is given for this optimal design. Here, optimal is used loosely since the blocker design considered is confined to be a rectangular prism.

Adiabatic Effectiveness

A Parametric Study via Taguchi's Design of Experiments For the rectangular-prism blockers shown in FIG. 3. The effects of the following three design parameters are sought: 0.8D, D, and 1.2D for the spacing between blockers a; 0.2D, 0.4D, and 0.6D for the height of the blockers b; and D/20, D/10/, and D/5 for the thickness of the blockers c. If a full factorial study is to be performed (i.e., one parameter is varied at a time) to assess the effects of the three parameters at the three levels, then a total of $3^3$ or 27 simulations will be needed. To reduce the number of simulations needed, the Taguchi fractional factorial (Taguchi, 1978; Dehnad, 1990) is employed, where the number of simulations can be reduced to six. These six simulations are summarized in Table 1.

TABLE 1

Summary of Runs of the Taguchi's Study

| Run No. | a | b | c |
|---|---|---|---|
| 1 | a1 = 0.8D | b1 = 0.2D | c1 = D/20 |
| 2 | a1 | b2 = 0.4D | c2 = D/10 |
| 3 | a2 = D | b3 = 0.6D | c3 = D/5 |
| 4 | a2 | b1 | c2 |
| 5 | a3 = 1.2D | b2 | c3 |
| 6 | a3 | b3 | c1 |

Figure 7:
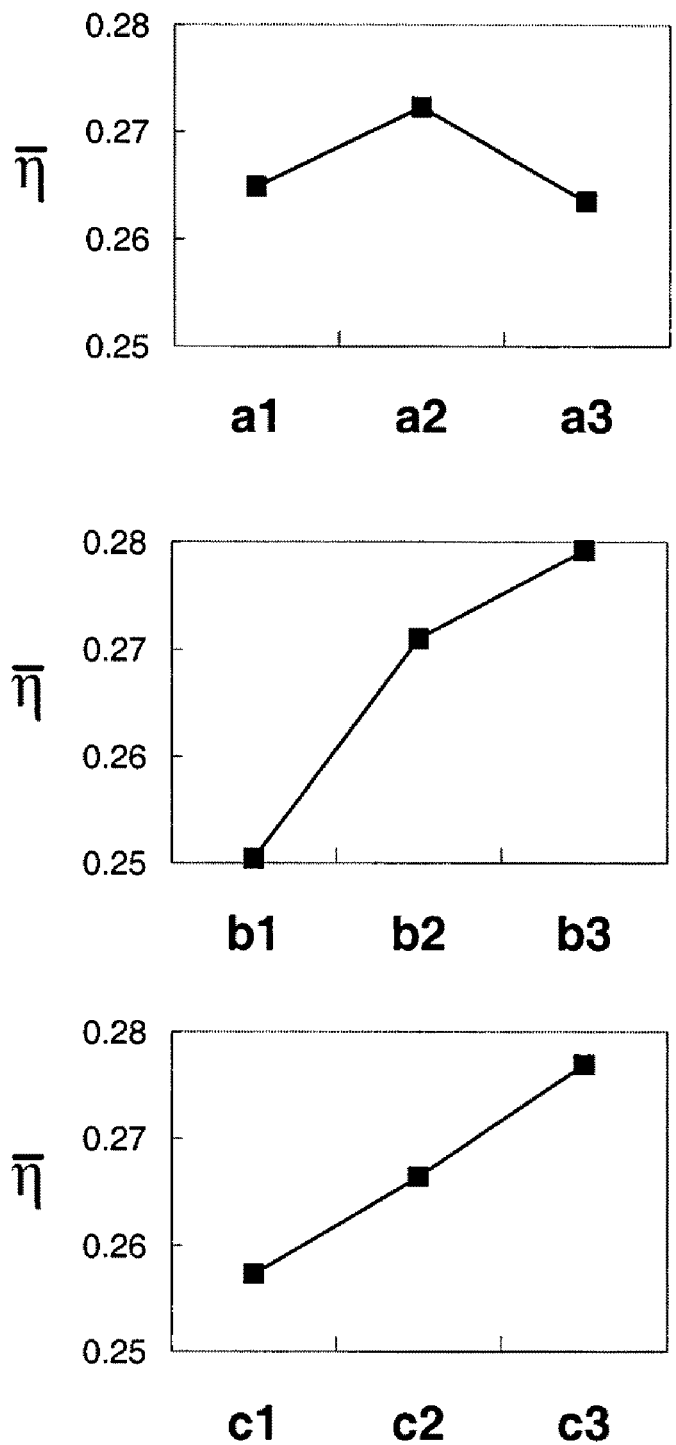
FIG. 7 is an effects of a, b, and c on average adiabatic effectiveness.
Figure 8:
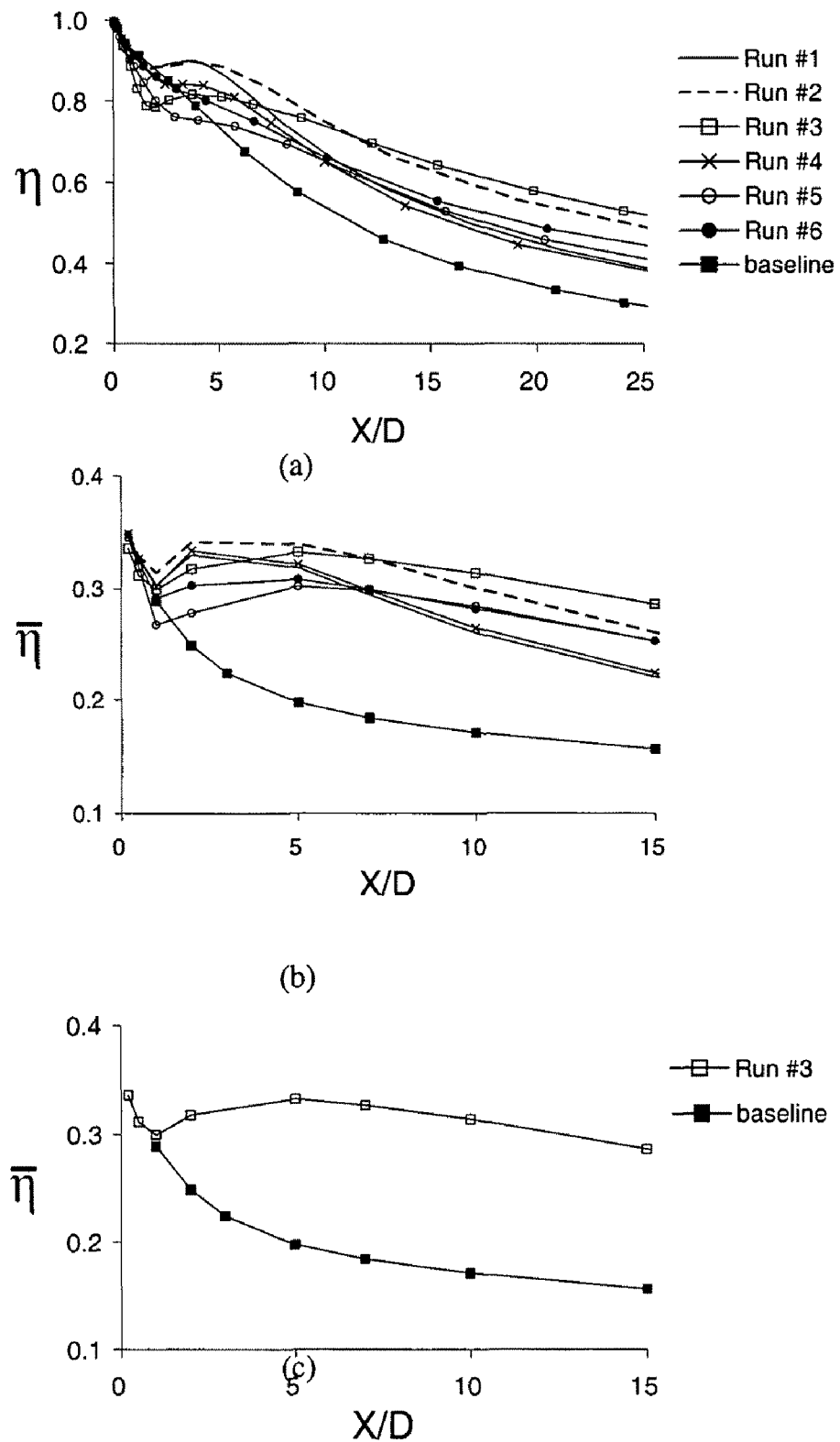
FIG. 8 is a surface adiabatic effectiveness with and without blockers (M=0.5). (a) Centerline adiabatic effectiveness for all 6 runs in Table 1. (b) Laterally averaged adiabatic effectiveness for all six runs in Table 1. (c) Laterally averaged adiabatic effectiveness for the optimal blocker, run 3 in Table 1.

The results of the simulations summarized in Table 1 for the adiabatic effectiveness are given in FIGS. 7 to 8. FIG. 7 gives the average adiabatic effectiveness. From this figure, it can be seen that the averaged adiabatic effectiveness is highest when a=a2=D, b=b3=0.6D, and c=c3=D/5, which corresponds to run number 3 in Table 1. Thus, for the range of the parameters studied, the optimal design has the pair of rectangular prism blockers to be spaced D apart and that each blocker should have a height of 0.6D and a thickness of D/5. FIG. 7 also shows that D may indeed be near optimum for the spacing between the blockers. However, optimum values for the height and thickness of the blocker remain unclear since the effects of these two parameters remained monotonic in the range studied. It is anticipated that the optimal height is related to the blowing ratio, and the optimal thickness of each blocker is related to the spacing between film-cooling holes since there is a region between film-cooling holes that are unprotected by film cooling. Thus, a true optimal design even for the simple configuration considered here requires further study.

Figure 12:
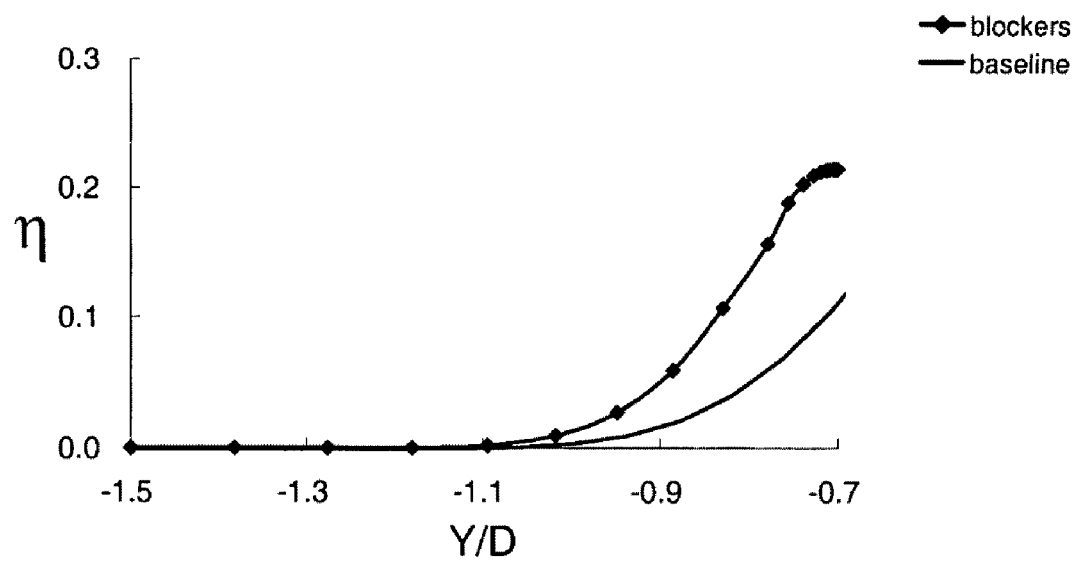
FIG. 12 is a surface adiabatic effectiveness with and without blockers with M=0.5 at X/D=3. (a) Region outside of blockers. (b) On top of blockers.
Figure 12:
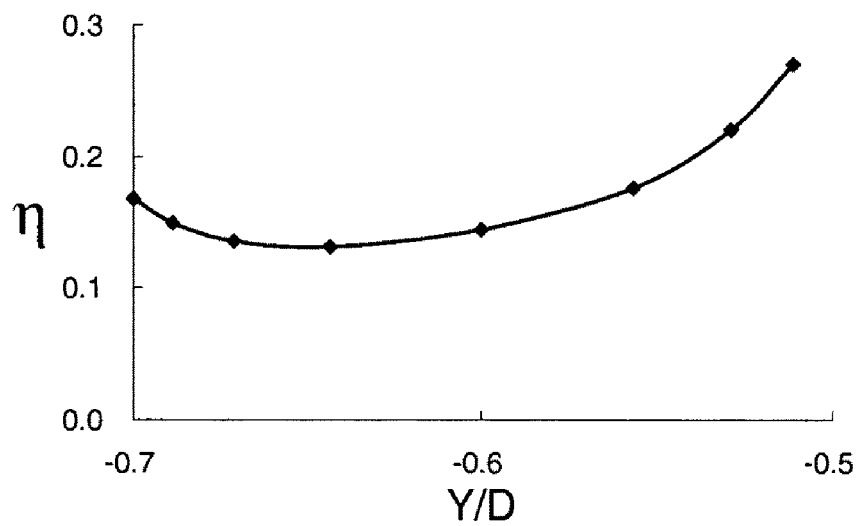

FIGS. 8 and 9 show the computed surface-adiabatic effectiveness. FIG. 8 shows the centerline and the laterally averaged adiabatic effectiveness for all six runs in Table 1 as a function of X/D. From this figure, it can readily be seen that all "blockers" investigated greatly improve laterally averaged adiabatic effectiveness. For the "optimal" case studied (run 3), FIG. 8(c) shows the blockers to maintain the laterally averaged adiabatic effectiveness at nearly the highest levels from D to 15D downstream of the film-cooling hole. At 15D downstream of the film-cooling hole, blockers improved laterally averaged adiabatic effectiveness by about a factor of two, which is quite significant. FIG. 9 shows the surface adiabatic effectiveness as a function of Y/D at X/D=3. From this figure, it can be seen that though the blockers may cause parts of the flat plate from being inadequately cooled, this is not the case. In fact, with the blockers, the adiabatic effectiveness is improved in all regions. One reason is that a part of the film-cooling jet is split by the blocker. Thus, FIGS. 8 and 12 show flow-aligned blockers to be useful in improving film cooling effectiveness.

Figure 13:
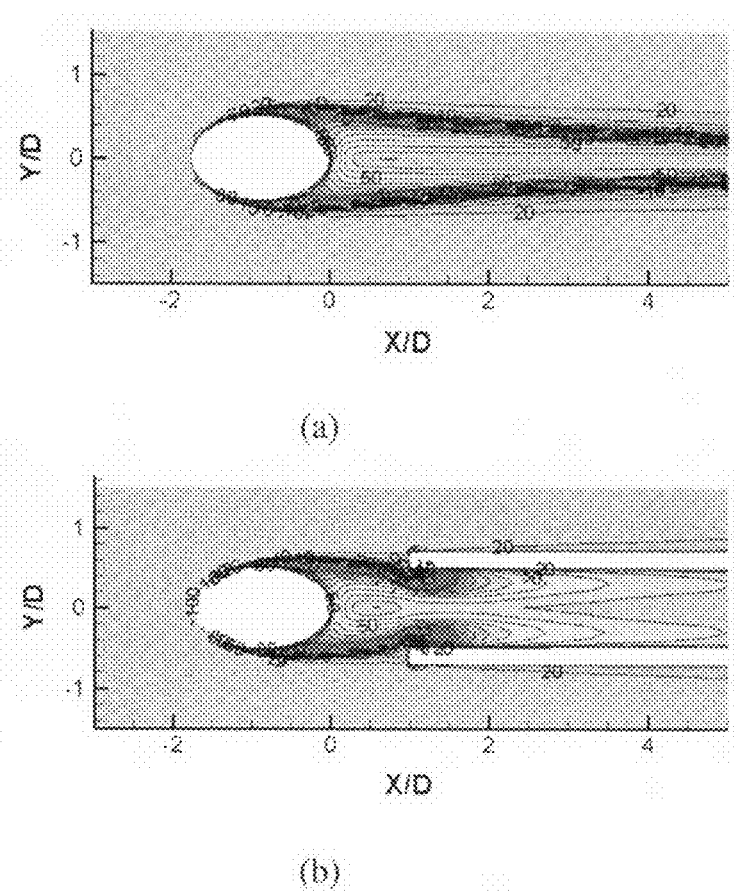
FIG. 13 is a predicted surface heat transfer coefficient (W/m²-K). (a) No blockers. (b) With rectangular-prism blockers.
Figure 14:
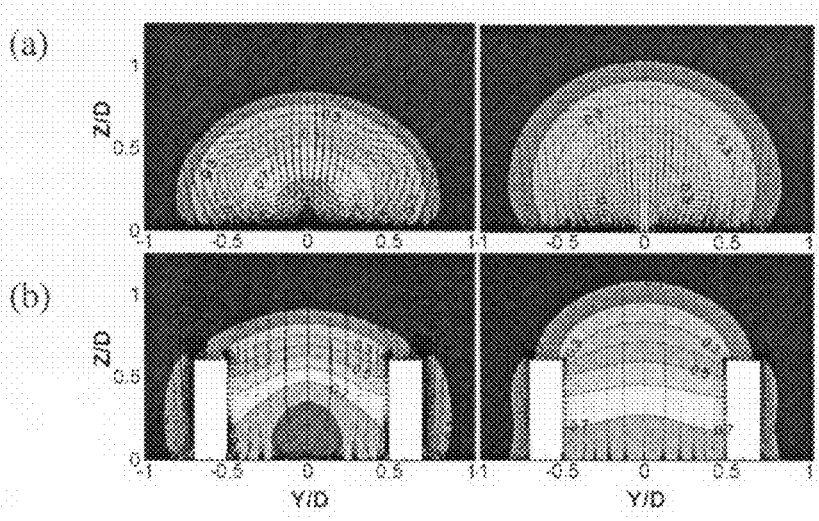
FIG. 14 is a normalized temperature $(T_\infty-T)/(T_\infty-T_c)$ at Y-Z planes located at X/D=3 and 7 for M=0.5. (a) No blockers. (b) With blockers (Run 3).

FIG. 13 shows the predicted surface heat transfer coefficient on the flat plate without blockers and with the optimal blocker (run 3 configuration). The heat transfer coefficients were computed in three steps. First, simulations were performed with adiabatic walls to obtain the adiabatic surface temperature on the flat plate, $T_{aw}$. Next, computations were performed for the same configuration and operating conditions except the flat plate is maintained at a constant wall temperature $T_w$ of 243K to predict surface heat transfer per unit area, $q_w$. Then, the heat transfer coefficient h is computed by $q_w/(T_w-T_{aw})$. From FIG. 13, it can be seen that the blockers increase surface heat transfer slightly near its leading-edge, but reduces surface heat transfer downstream of the blockers. The slight increase in surface heat transfer at the leading edge of the blocker may not be significant since the adiabatic effectiveness is high there. The reduced surface heat transfer downstream of the blockers resulted from reduced temperature gradients that arose from less hot gas entrainment. The average heat transfer rate per unit area for the entire flat plate with and without rectangular-prism blockers is −781.34 W/m², and −1094.70 W/m², respectively. The average heat transfer coefficient with and without rectangular-prism blockers is 24.40 W/m²-K and 25.02 W/m²-K, respectively. Thus, in general the blockers studies were found to reduce surface heat transfer instead of increasing them. This also means that the extended surface due to blockers may not be a concern.

Though surface heat transfer was not increased by the blockers, computed results show that there is non-negligible pressure rise. When there are no blockers, the average pressure drop from the inflow to the outflow boundary above the flat plate is 10.66 Pa. When there are rectangular blockers, it increases to 16.07 Pa. This represents an increase of 5.41 Pa or 51%, which is considerable. The magnitude of the average shear stress for the flat plate without blockers is 1.14 Pa. The magnitude of the average shear stress for the case with blockers that include the shear stress on the flat plate and on the blockers is 0.95 Pa. This indicates the rise in pressure loss from the blockers is due to pressure of the leading and trailing edges instead of from shear. Thus, one way to reduce this pressure rise is to streamline the leading and the trailing edges. For example, instead of the flat leading and trailing faces as shown in FIGS. 1 and 3, they can be rounded at the leading edge and pointed at the trailing edge, similar to that of an airfoil.

Nature of the Flow

With an "optimal" blocker design identified from the range of the design parameters investigated, this section examines how this blocker (a=D, b=0.6D, and c=D/5) minimizes hot gas entrainment and thereby increase film-cooling adiabatic effectiveness. FIG. 11 shows normalized temperature $(T_g-T)/(T_g-T_c)$ at two Y-Z planes, one located at X/D=3 and one at X/D=7 in which the blowing ratio is M=0.5 with and without blockers. From this figure, it can be seen that the two blockers confine the cooling flow within it and prevents the entrainment of hot gases. By X/D=7, the coolant is fairly well mixed along the spanwise Y direction so that the temperature variation is mostly along Z. Since the blockers are placed D downstream of the film-cooling-hole exit, the cooling flow also wraps around the "outer" sides of the blockers. Thus, cooling extends beyond the blockers by as much as 0.2D beyond the blockers. This, of course, improved the film-cooling effectiveness outside of the blockers as shown in FIG. 12.

Figure 15:
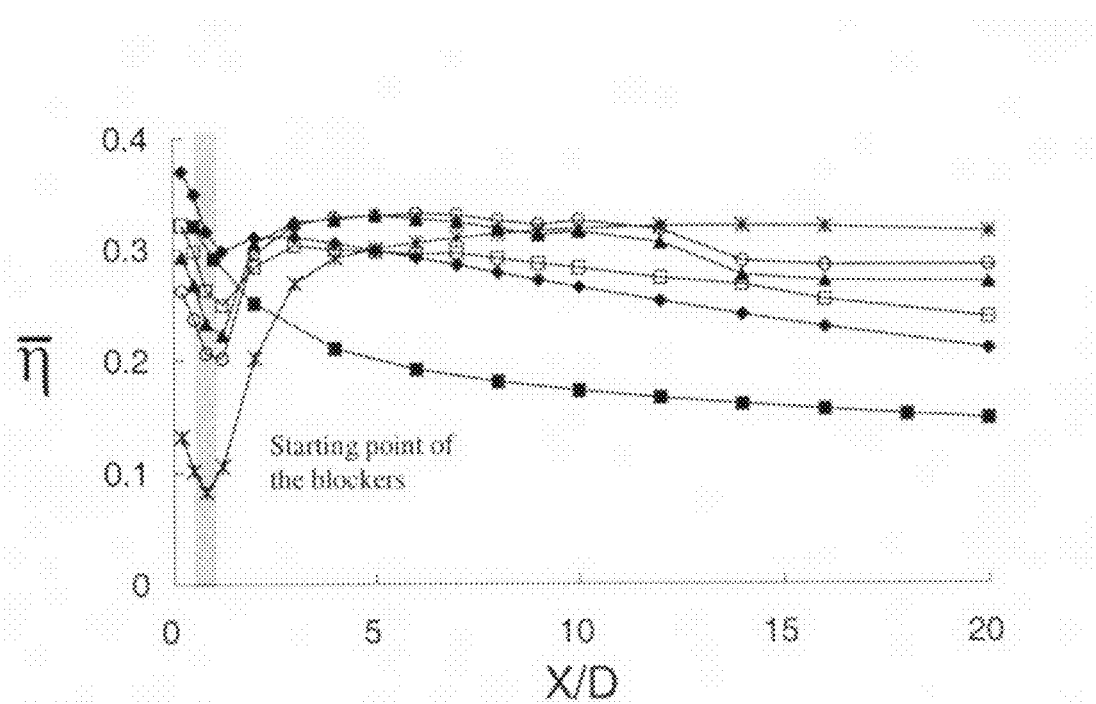
FIG. 15 is a laterally averaged adiabatic effectiveness for several blowing ratios. Baseline has blowing ratio of 0.5
Figure 16:
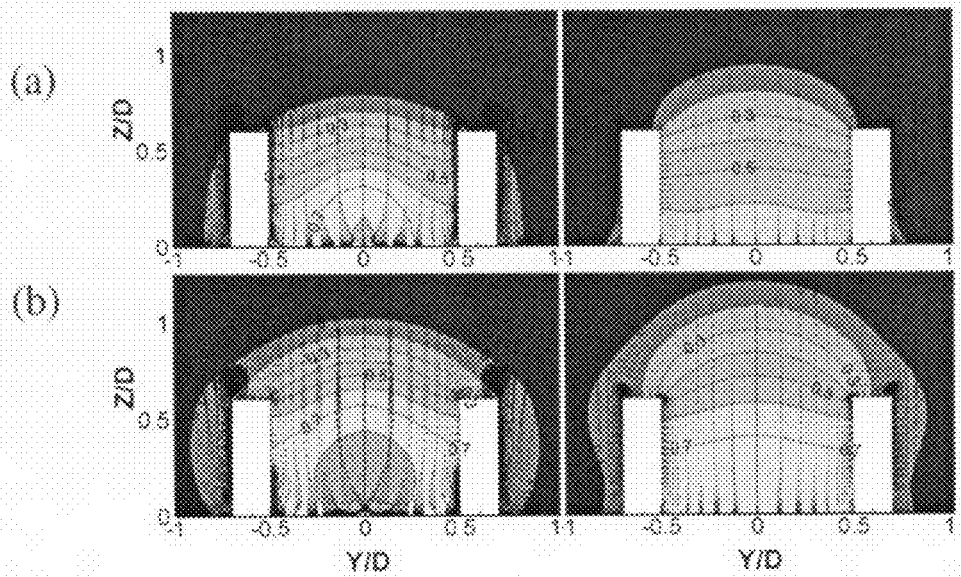
FIG. 16 is a normalized temperature $(T_\infty-T)/(T_\infty-T_c)$ at Y-Z planes located at X/D=3 and 7. (a) M=0.37. (b) M=0.65.

To further examine the usefulness of this blocker, simulations were done with slightly lower and slightly higher blowing ratios for the same blocker geometry (run 3). Results of these simulations are shown in FIGS. 15 and 16. In these two figures, it can be seen that even with a blowing ratio of M=0.37, laterally averaged adiabatic effectiveness is still quite respectable when there are blockers. With a lower blowing ratio, the cooling flow rate is less and so the wrap-around about the blockers is reduced. When the blowing ratio increases to M=0.65, the laterally averaged adiabatic effectiveness improves further. With higher blowing ratio, more of the coolant spills over and around the blockers.

SUMMARY

The present invention provides for "flow-aligned blockers" to increase the adiabatic effectiveness of film-cooling jets by minimizing hot-gas entrainment without unduly increasing surface heat transfer and pressure loss. Numerical simulations based on the compressible Navier-Stokes equations were performed to investigate the usefulness of a blocker geometry that has a rectangular cross section. A parametric study based on the Taguchi's method was used to examine the effects of three parameters: spacing between blockers, height of blockers, and the thickness of each blocker. A limited study on the effects of blowing ratio was also carried out. Results obtained show that the blockers studied are highly effective in preventing hot-gas entrainment and can increase adiabatic effectiveness significantly by confining the coolant flow between the blockers. For the blockers studied, the laterally averaged adiabatic effectiveness at 15D downstream of the film-cooling hole can be as high as that at 1D downstream. The blockers studied were found to increase surface heat transfer only slightly in the region about the leading edge of the blockers. Downstream of the blockers, surface heat transfer was reduced. There is, however, some rise in pressure loss because of the flat leading and trailing edges, indicating a need for streamlining there.

It is to be appreciated that although the embodiment described generally relate to use in a gas turbine, the present invention can be used in other appropriate applications. It is to be understood that the present invention contemplates numerous variations, including variations in the geometry of blockers, the position of the blockers, the type of hot gas, the type of coolant, the number of film-cooling holes, the arrangement of film-cooling holes whether in a row, pattern, or otherwise, variations in blowing ratio, and other variations.

REFERENCES

Bunker, R. S. (2002). "Film Cooling Effectiveness Due to Discrete Holes Within Transverse Surface Slots." *ASME paper* GT-2002-30178.
Goldstein, R. (2001). "Heat Transfer in Gas Turbine Systems." *Annals of the New York Academy of Sciences* 934.
Goldstein, R. J. (1971). "Film Cooling." *Advances in Heat Transfer*, Academic Press, New York, Vol. 7, pp. 321-379.
Han, J. C., S. Dutta, et al. (2000). Gas Turbine Heat Transfer and Cooling Technology. New York, Taylor & Francis.
Haven, B. A. and M. Kurosaka (1997). "Kidney and Anti-Kidney Vortices in Crossflow Jets." *J. Fluid Mech.* 352: 27-64.
Haven, B. A. and Kurosaka, M. (1996) "Improved Jet Coverage through Vortex Cancellation," *AIAA J.*, Vol. 34, No. 11, pp. 2443-2444.
Hyams, D. G., McGovern, K. T., and Leylek, J. H., 1997, "Effects of Geometry on Slot-Jet Film Cooling Performance," *ASME paper* 96-GT-187.
Kelso, R. M., T. T. Lim, et al. (1996). "An Experimental Study of Round Jets in Cross-Flow." *J. Fluid Mech.* 306: 111-144.
Kercher, D. M. (2003). "Film-Cooling Bibliography: 1940-2002."
Kercher, D. M. (2005). "Film-Cooling Bibliography Addendum: 1999-2004."
Kohli, A. and D. G. Bogard (1995). "Adiabatic Effectiveness, Thermal Fields, and Velocity Fields for Film Cooling with Large Angle Injection." *ASME paper* 95-GT-219.
Metzger, D. E., "Cooling Techniques for Gas Turbine Airfoils," *AGARD CP* 390, 1985, pp. 1-12.
Moffat, R. J., "Turbine Blade Heat Transfer," *Heat Transfer and Fluid Flow in Rotating Machinery*, Editor: W. J. Yang, Hemisphere, Washington, D.C., 1987, pp. 1-24.
Shih, T.-H., W. Liou, et al. (1995). "A New k-ε Eddy-Viscosity Model for High Reynolds Number Turbulent Flows—Model Development and Validation." *Computers and Fluids* 24(3): 227-238.
Shih, T. I.-P., Y.-L. Lin, et al. (1999). "Computations of Film Cooling from Holes with Struts." *ASME paper* 99-GT-282.
Shih, T. I-P. and Sultanian, B., "Computations of Internal and Film Cooling," *Heat Transfer in Gas Turbines*, Editors: B. Sundén and M. Faghri, WIT Press, Ashurst, Southhampton, 2001, Chapter 5, pp. 175-225.
Sunda, B. and Faghri, M., "Heat Transfer in Gas Turbines." *WIT Press*, Ashurst, Southhampton, 2001.
Suo, M., "Turbine Cooling, Aerothermodynamics of Aircraft Engine Components." Editor: G. C. Oates, *AIAA*, New York, pp. 275-328, 1985.
Thole, K., M. Gritsch, et al. (1998). "Flowfield Measurements for Film-Cooling Holes with Expanded Exits." *ASME Journal of Turbomachinery* 120: 327-336.
Zaman, K. B. M. Q. (1998). "Reduction of a Jet Penetration in a Cross-Flow by Using Tabs." *AIAA paper* 98-3276.
Zaman, K. B. M. Q. and J. K. Foss (2005). "The Effects of Vortex Generators on a Jet in a Cross-Flow." *Physics of Fluids* 9(No. 1): 106-114.

What is claimed is:

1. A system for cooling, comprising:
a flat surface to be cooled;
at least one film-cooling hole within the surface for allowing a film cooling jet of coolant to reach the surface, each of the at least one film-cooling hole having a diameter;
at least two spaced apart flow-aligned blockers positioned downstream of the at least one-film cooling hole, each of the flow-aligned blockers extending upwardly from the surface to assist in preventing hot-gas entrainment and increasing adiabatic effectiveness by confining coolant flow downstream of the at least one film-cooling hole between the blockers;
wherein a spacing between the flow-aligned blockers is about the length of the diameter.

2. The system of claim 1 wherein a height of the flow-aligned blockers is less than the diameter.

3. The system of claim 1 wherein a thickness of the flow-aligned blockers is equal or less than ⅕ of the diameter.

4. The system of claim 1 wherein each of the flow-aligned blockers has a rectangular cross section.

5. The system of claim 1 wherein the flow-aligned blockers are formed using a ceramic top coat.

6. The system of claim 1 wherein the surface is disposed within a gas turbine.

7. The system of claim 6 wherein the surface is within a first stage stator of the gas turbine.

8. The system of claim 1 wherein each of the at least one film-cooling hole within the surface is a circular hole.

9. The system of claim 8 wherein each of the at least one film-cooling hole is inclined.

10. The system of claim 1 further comprising a plenum for delivering the coolant to each of the at least one film-cooling hole.

11. The system of claim 1 wherein the at least one film-cooling hole includes a plurality of film-cooling holes placed in a row.

12. An improvement to a gas turbine having a flat surface proximate hot gas, comprising:
at least one film-cooling hole providing access for a film cooling jet of coolant to reach the surface to thereby form a cool film between the hot gas and the surface;
at least two spaced apart flow-aligned blockers positioned downstream of the at least one-film cooling hole, each of the flow-aligned blockers extending upwardly from the surface to assist in preventing hot-gas entrainment and increasing adiabatic effectiveness by confining coolant flow downstream of the at least one film-cooling hole between the blockers; and
wherein a spacing between adjacent of the flow-aligned blockers is about a length of the diameter of the at least one film-cooling hole.

13. The improvement to the gas turbine of claim 12 further comprising a plenum in fluid communication with the at least one film-cooling hole to deliver the coolant.

14. The improvement to the gas turbine of claim 12 wherein the at least one film-cooling hole is inclined.

15. The improvement to the gas turbine of claim 12 wherein the at least one film-cooling hole is circular.

16. The improvement to the gas turbine of claim 12 wherein each of the flow-aligned blockers has a rectangular cross section.

17. The improvement to the gas turbine of claim 12 wherein the at least one film-cooling hole comprises a plurality of film-cooling holes organized in a row.

18. The improvement to the gas turbine of claim 12 wherein the flow-aligned blockers are formed using a ceramic top coat.

19. A method of cooling a flat surface, comprising:
providing coolant through a film-cooling hole to form a cool film between the hot gas and the surface;
using a plurality of flow-aligned blockers extending upwardly from the surface and positioned at a distance downstream of the film-cooling hole to affect film-cooling effectiveness;
wherein a spacing between the flow-aligned blockers is about a length of a diameter of the film-cooling hole.

20. The method of claim 19 wherein the surface is disposed within a gas turbine.

21. The method of claim 19 wherein the film-cooling hole is inclined.

22. The method of claim 19 wherein the film-cooling hole is circular.

23. The system of claim 19 wherein geometry of the flow-aligned blockers is at least partially based on blowing ratio.

24. A system for cooling, comprising:
a flat surface to be cooled;
at least one film cooling hole within the flat surface for allowing a film cooling jet of coolant to reach the surface, each of the at least one film-cooling hole having a diameter;
at least two spaced apart flow-aligned blockers positioned downstream of the at least one-film cooling hole, each of the flow-aligned blockers being of a rectangular prism shape and extending upwardly from the surface to assist in preventing hot-gas entrainment and increasing adiabatic effectiveness by confining coolant flow downstream of the at least one film cooling hole between the blockers;
wherein a spacing between the flow-aligned blockers is about the length of the diameter.

25. The system of claim 24 wherein a spacing between the flow-aligned blockers is about the length of the diameter, the height of the flow-aligned blockers is less than the diameter, and wherein each of the flow-aligned blockers has a rectangular cross section.

* * * * *